United States Patent [19]
Davidson

[11] Patent Number: 5,327,116
[45] Date of Patent: Jul. 5, 1994

[54] LOW TRAILER TIRE DETECTION DEVICE

[76] Inventor: Billy D. Davidson, 2742 Larkspur, Dallas, Tex. 75233

[21] Appl. No.: 999,597

[22] Filed: Dec. 31, 1992

[51] Int. Cl.$^5$ .................. B60C 23/00; B60C 23/06
[52] U.S. Cl. .................. 340/443; 116/34 R; 200/61.24
[58] Field of Search ............... 73/146.5, 146.4, 146.2; 340/443, 442, 437, 436; 116/34 R; 200/61.41, 61.42, 61.44, 61.24

[56] References Cited

U.S. PATENT DOCUMENTS

| | | | |
|---|---|---|---|
| 2,639,342 | 5/1953 | Cope | 200/58 |
| 2,640,119 | 5/1953 | Bradford | 200/58 |
| 2,740,007 | 3/1956 | Amelang | 200/61.24 |
| 3,096,410 | 7/1963 | Anderson | 200/61.24 |
| 3,265,822 | 8/1966 | Moulton | 200/61.24 |
| 3,502,829 | 3/1970 | Reynolds | 200/61.24 |
| 3,602,885 | 8/1971 | Grajeda | 200/61.44 X |
| 3,610,851 | 10/1971 | Krupski | 200/61.24 |
| 4,075,602 | 2/1978 | Clothier | 340/443 X |
| 5,032,822 | 7/1991 | Sweet | 340/443 |

FOREIGN PATENT DOCUMENTS 118360 4/1944 Australia ............... 340/443

Primary Examiner—Richard E. Chilcot, Jr.
Assistant Examiner—Joseph L. Felber
Attorney, Agent, or Firm—John W. Montgomery

[57] ABSTRACT

A low tire pressure sensor for use in detecting deflation of a tire while it is supporting a tow trailer from a surface as it moves in a given direction therealong. The sensor comprises a sealed housing holding a pivot shaft and enclosing an electrical contact switch which is activatable upon rotation of the pivot shaft from a first biased position to a second position. The pivot shaft has an outside portion which extends sealingly and rotatably through a portion of the housing. A resilient sensor rod is mounted on the outside portion of the pivot shaft and extends therefrom at an angle forward in the direction of movement of the tire when the pivot shaft is in a first biased position. The resilient sensor rod has an end spaced a predetermined distance from the surface, such that upon at least partial deflation of the tire, the resilient sensor rod contacts the surface and is moved over center to rotate the pivot shaft to a second switch position, at which the electrical contact switch is activated. A remote signal device is connected through an electrical circuit to the switch so that it is activated upon rotation of the pivot shaft from the first biased position to the second switch activation position.

12 Claims, 3 Drawing Sheets

LOW TRAILER TIRE DETECTION DEVICE

TECHNICAL FIELD OF THE INVENTION

The present invention relates to a device for detecting flat tires on tow trailers, and in particular, to a water-resistant, corrosion resistant, and damage resistant low tire detector which conveniently fastens to the axle of a trailer.

BACKGROUND OF THE INVENTION

The operator of a vehicle can normally sense when one of the pneumatic tires on the vehicle becomes deflated because of a tilting of the vehicle itself. However it is not as easy to sense the occurrence of tire deflation in a trailer which is being towed along a roadway behind the vehicle being driven. This is particularly true where the tow trailer is of a size and dimension relative to the vehicle such that the tires of the tow trailer are not easily observed. Sensing a low tire on a trailer is also difficult if it is connected to the vehicle through a ball hitch which does not translate tilting motion of the trailer caused by tire deflation. Further, tow trailers are often pulled along a roadway at night, such that viewing the trailer is difficult. Further, constant attention to and observation of a trailer being towed can be distracting and particularly annoying to a driver with a utility trailer, a boat trailer, a recreational camper trailer, or another similar tow trailer.

In the past, various tire deflation warning devices and low tire indicators have been designed which attach to an axle adjacent a tire. Typically, such devices have an elongated rod, which is spaced slightly above the ground and is guided straight up and down for vertical movement upon contacting the road surface due to deflation of the tire. Vertical movement of the rod activates an electrical contact switch which is connected to a warning signal. Such devices, for example, are disclosed in U.S. Pat. No. 2,639,342 issued to Cope in 1953 and U.S. Pat. No. 5,032,822 issued to Sweet in 1991. It has been found that vertical actuation of the rod is not likely to occur without a bending action also, unless the deflation occurs while the vehicle is stopped. If deflation occurs while the vehicle is moving, the frictional forces at the point of contact between the vertically actuatable rod and the roadway surface will tend to bend the rod and thereby render the device inoperable. Rolling elements at the ground contacting end of the sensor rod, such as that disclosed in the Sweet '822 patent are designed to reduce this problem. Rolling elements of any effective size will cause the cost of the device to be substantially increased. Small diameter rolling contact, with a roadway of normal roughness, is not likely to avoid bending the actuation rod.

Another tire pressure indicator, as disclosed in U.S. Pat. No. 2,740,007, provides for a small amount of angular movement, as well as vertical movement, of the actuation rod. It is the small amount of angular movement which first causes an electrical contact, thereby indicating a deflated tire condition. However, the range of movement of such a device in the '007 patent is not sufficient to insure against damage where deflation occurs rapidly, as it does, for example, in a complete blow-out situation.

Various other devices have been disclosed in which the sensor rod is constructed of a hollow coil spring with a flexible cable extending through the center of the coil spring. Examples of such devices are shown in U.S. Pat. Nos. 3,096,410 issued to Anderson in 1963 and U.S. Pat. No. 3,265,822 issued to Moulton in 1966. Both of these devices rigidly connect the upper end of a coil spring to the housing of the detection device. The coil spring has a distal end having a ball or a cap which will contact the roadway surface upon tire deflation. Between the contacting ball or cap and the rigidly connected upper end of the spring, a fixed length cable is connected. Thus, upon contacting the surface the spring is bent backward, thereby increasing its length due to the arc, so that relative movement of the fixed length flexible cable through the center of the coil spring activates a switch mechanism, thereby signalling the deflated tire condition. These devices require a relatively complex and expensive spring and internal cable mechanism plus connecting linkage and a switch mechanism which is relatively complicated, and subject to wear. Further, the entire mechanism is adversely affected by corrosion. For example, dirt and road grime can cause malfunction. Further, if used in wet weather conditions, or on a boat trailer which is periodically submerged in water, the apparatus may corrode and jam or the switch may fail or otherwise adversely affect reliability.

Other flat tire signal devices have been disclosed in U.S. Pat. No. 2,640,119 issued to Bradford, Jr. in 1953 and another U.S. Pat. No. 3,502,829 issued to Reynolds in 1970, which devices activate electrical switch contact upon rotation of a rigid sensor rod about a pivot axis located in the signal device housing. Such devices depend upon a straight tension spring acting through a lever arm to hold the sensor rod in a vertically downward position. Rotation of the vertical rod about the pivot axis works against the linear tension spring to actuate an electrical switch for a warning signal. Neither of these devices provide for a pivot shaft for activating a simplified electrical switch, the moving parts of which are completely sealed in a weather resistant and water-tight housing. Further, there is no disclosure of any mechanism for flexible compensation of a vertical component of force which may be imparted into the rotation mechanism upon tire deflation.

SUMMARY OF THE INVENTION

Applicant's inventive low trailer tire detection device overcomes the foregoing drawbacks of the prior low tire warning devices by providing a low tire pressure sensor for use in detecting deflation of the tire while the tire is supporting a tow trailer from a roadway surface as it moves in a given direction along the roadway. A water-resistant and corrosion resistant housing encloses a simplified and reliable electrical contact switch. The switch is activatable upon rotation of a pivot shaft from a first biased position to a second position. The pivot shaft has a cam surface sealed inside of the housing which is connected to an outside end which sealingly and rotatably extends through a portion of the completely sealed housing. A resilient sensor rod is mounted on the outside portion of the pivot shaft for rotation therewith. When the pivot shaft is in a first biased position, the switch is open and the resilient sensor rod is at a slight angle forward in the direction of trailer movement. The distal end of the resilient sensor rod is spaced a short clearance distance from the roadway surface. Upon at least partial deflation of the tire, by an amount corresponding to the predetermined spaced clearance distance, the resilient sensor contacts the surface and is resiliently bent backward to rotate the pivot shaft to the second switch activation position. Advantageously, the forward angle causes the sensor rod to "pop" over center into a stable rearward position. Any potentially destructive vertical component of force is accommodated by the resilience of the sensor rod. Upon activation of the sealed switch inside of the housing, a remote signal device is electrically activated to indicate to the operator, such as the driver of a towing vehicle, that there is deflation in the trailer tire.

Thus, it is an object of the invention to provide a low tire pressure sensor which is waterproof, sealed against water and contaminant infiltration. The electrical contacts are totally enclosed, as are all bearing surfaces within a sealed housing. The housing is openable for maintenance; but, during operation, the housing remains totally sealed from exposure to outside conditions.

Further, it is an object of the invention to provide a low tire pressure sensor which is activated by rotation and has a resilient sensor rod to accommodate both potentially destructive bending forces and vertical components of force. Preferably, the resilient sensor rod extends at an angle forward of the rotatable pivot point and moves over center upon tire deflation into a stable closed switch condition. Both bending and compression forces are accommodated through deflection of the resilient rod. The pivot shaft rotates into a second switch activation position without damage to the sensor device.

It is a further object of the invention to provide a water-resistant and reliable low tire pressure sensor which can be cost effectively manufactured with an injection molded housing, reliable component construction, and simplified assembly. Preferably, reliability is further enhanced through the use of a torsional spring to continually bias a sensor rod into a non-activated position until deflation of a tire occurs.

BRIEF DESCRIPTION OF THE DRAWINGS

These and other objects and advantages will be more fully understood with reference to the following detailed description, claims, and drawings, in which like numerals represent like elements and in which:

DETAILED DESCRIPTION OF THE PREFERRED EMBODIMENTS

Figure 1:
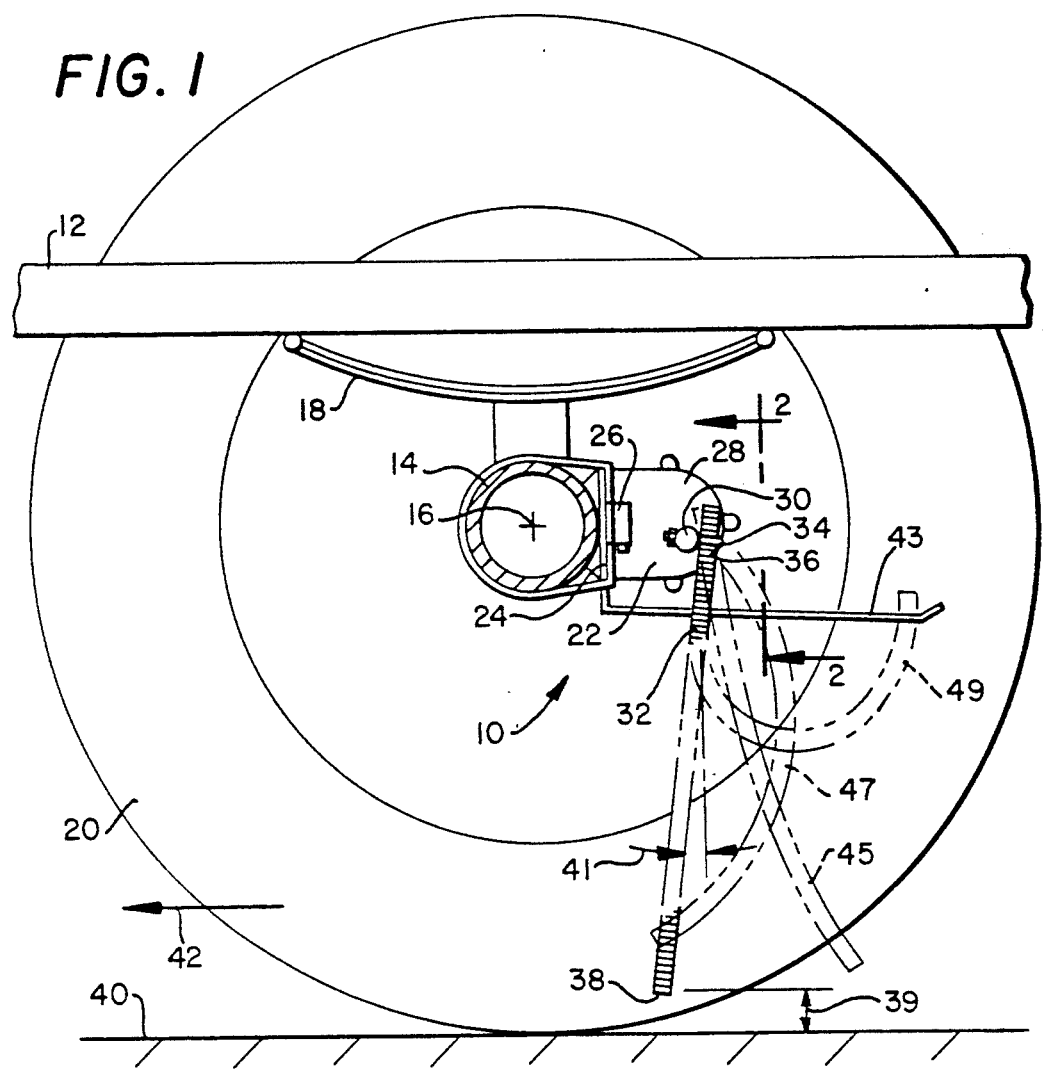
FIG. 1 is a partial schematic side view of a low trailer tire detection and warning device attached under a trailer frame to an axle adjacent a rolling tire.

FIG. 1 shows a partial schematic view of a low trailer tire detection and warning device, generally designated as number 10, which is mounted under a trailer or vehicle frame 12. The device is clamped to an axle 14 which is typically supported with suspension means 18 from the trailer frame 12 and which has tires 20 (one shown) rotating coaxially with axis 16 of axle 14. The detection device 10 comprises a device housing 22 which is clamped directly to axle 14 adjacent to the inside of each tire 20 or on the inside of each set of tires for larger trailers. For example, the housing may have a base 24 around which a clamp 26, such as a hose clamp or other strap clamp is fitted for securely attaching the housing to the outside of any non-rotating axle, whether cylindrical shaped or rectangular shaped. Where the housing 22 is mounted toward the rear of the trailer axle relative to the direction of trailer motion 42, the housing is shielded from debris by the axle 14. The device housing 22 has a side wall 28 through which a rotation shaft 30 extends. Rotation shaft 30 has a resilient sensor rod 32 attached to it so that movement of the sensor rod 32 causes rotation of shaft 30. The attachment of rod 32 to shaft 30 can conveniently be made through a bolt arrangement such as a U-bolt 34 fitted around upper end 36 of resilient sensor rod 32. The sensor rod 32 extends downward toward the ground such that a contact end 38 is spaced a short distance 39 above a roadway surface 40. The spatial distance 39 is conveniently adjustable by loosening connector bolt 34, so that it will slip about upper portion 36 of sensor rod 32, and then by tightening it again when located properly. Preferably, the sensor rod 32 is constructed of a resilient and durable material, such as a metallic coil spring, which is corrosion resistant. Preferably, a durable steel spring which may be coated with a corrosion resistant coating, such as a galvanized electroplating, or the like.

Preferably also, the sensor rod 32 is normally positioned for operation at an angle 41, slightly forward of rotation shaft 30 in the direction of trailer motion 42. However, a hanger arm 43 can be advantageously attached as by clamping it to axle 14, so that the resilient sensor rod 32 can be held by the hanger arm 43 in a non-operating position 49. This allows the user to conveniently prevent excess rubbing and needless wear in deep mud or deep snow road conditions.

The end 38 of sensor rod 32 contacts the ground when the tire is at least partially deflated. The slightly forward angle 41 of the resilient sensor rod 32 advantageously allows it to move rearward into a stable tilted backward position upon partial deflation while the trailer is moving, as shown with phantom lines at 45. Also, if deflation occurs while standing still, the resilient rod will bend into an arc causing shaft 30 to rotate into a warning signal position as shown with phantom lines 47. This reliably rotates shaft 30 into its warning signal position when the trailer is moving. Also, as the sensor rod 32 is made of a resilient material and preferably is made of a metallic coil spring which has a small amount of compressibility, as well as bendability, the motion of the spring over center from the angled forward position while moving or while standing, can be easily accommodated with the spring action of the resilient sensor rod 32 absorbing any vertical forced imparted to the sensor rod.

Figure 2:
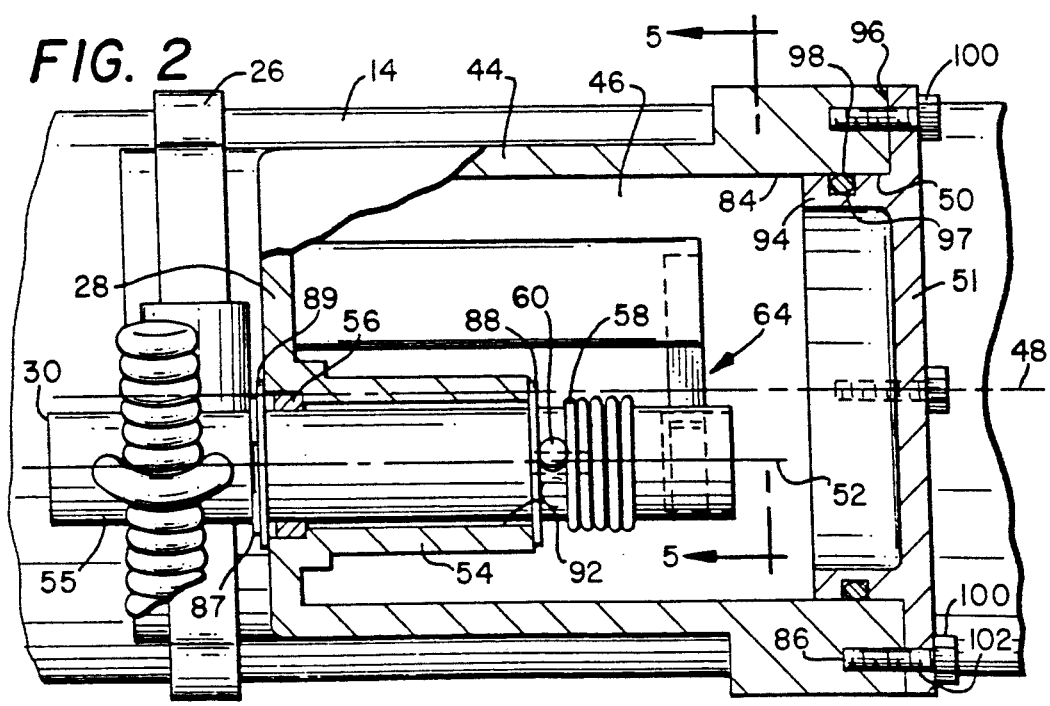
FIG. 2 is a partial cut-away cross-sectional view in the direction of section line 2—2 of the low tire detection and warning device shown in FIG. 1 according to the present invention.

FIG. 2 shows a partial cut-away cross-sectional view of the interior of the sensor housing in the direction of section line 2—2 through the housing 22. Housing 22 comprises a housing cup 44 having a closable interior cavity 46. Preferably, the housing cup 44 is substantially cylindrical having a central cup axis 48. A closable opening 50, which is formed in the housing 22 on the side opposite from side wall 28 and conveniently allows assembly, further permits replacement or repair of internal parts in the event that maintenance is ever required.

A symmetrical end cap 51 preferably comprises a cylindrical insertion plug portion 94 sized for slip fit insertion into smooth cylindrical sealing surface 84. A stop lip 96 abuts against the exterior of opening 50 on housing 22. Insertion plug portion 94 has a sealing ring 98 which is preferably an O-ring 98 positioned in an O-ring groove 97. Threaded fasteners 100 are positioned through attachment orifices 102 in lip portion 96 to engage threaded fastening holes 86 so that the internal moving parts, including shaft 30, torsion spring 56 and contact switch 64, are sealed within housing 22 against moisture and dirt infiltration. Preferably upon assembly, the interior of the housing is thoroughly dried so that any corrosive activity over an extended time period is substantially eliminated.

Rotation shaft 30 is rotatable about a shaft axis 52 which is offset from cup housing axis 48 to permit the housing 22 to be of a minimum size while accommodating the internal switching mechanism 64 as will be discussed more fully below. Shaft 30 is held for smooth rotation in a shaft rotational bearing boss 54. Preferably, shaft 30 has an external end 55 which extends through a shaft seal 56 mounted in housing side wall 28. Preferably, shaft seal 56 is a resilient water-tight seal of the type which permits rotation, yet seals against air and moisture infiltration. The housing 22 is further advantageously molded with a smooth interior cylindrical sealing surface 84 adjacent open end 50. Exterior cap fastening means, such as threaded fasteners 100 in threaded holes 86, may be formed around the opening 50 to permit secure and water-tight closure of the housing.

FIG. 2 further depicts the internal washer 88 which is held in position with pin 60 adjacent to bearing boss 54. The bearing boss preferably has a smooth cylindrical bearing surface 92 formed therein through which shaft 30 rotates and external to the rotational shaft seal 56, an external locating washer 89 is securely held in place as with a circular clip 87 or with a pin or with other holding means 87 to prevent it from slipping off of shaft 30.

Figure 3:
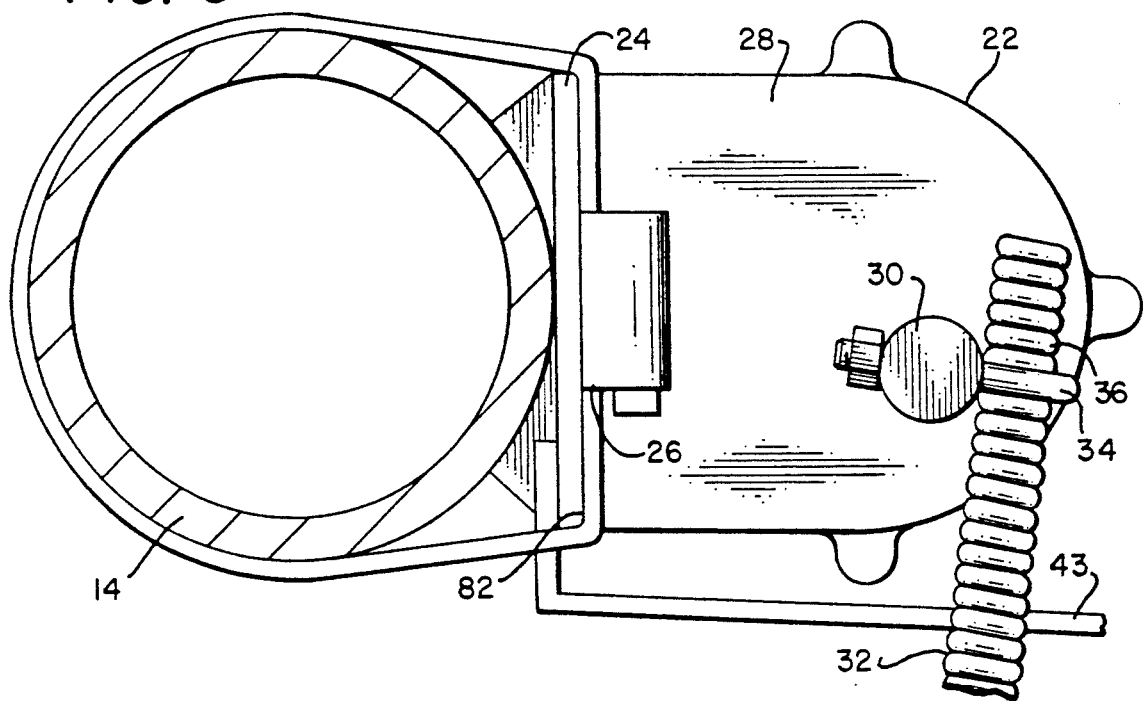
FIG. 3 is a left end view of a sealed housing of the low tire detection device of FIG. 2.

FIG. 3 shows a close-up left side view of the sensor housing 22 of FIG. 2 shown attached to axle 14 with clamp 26 around base 24. Clamping flange 82 may also be integrally injection molded and in fact, clamping flanges 82 may be conveniently formed as part of base 24 on each side of the housing 22 to facilitate secure clamping as with two hose clamps 26 on either side of the housing.

Figure 4:
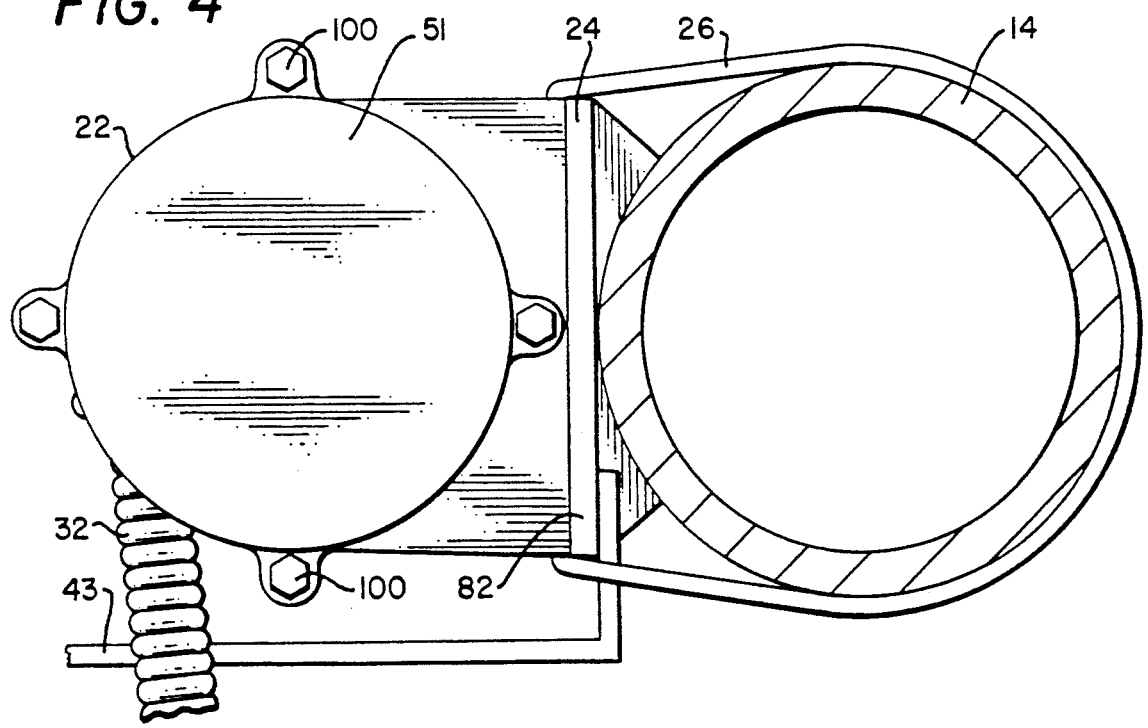
FIG. 4 is a right end view of a sealed housing of the low tire detection device of FIG. 2.

FIG. 4 shows a close-up right side view of sensor housing 22 of FIG. 2 shown with sealing end cap 51 removably attached with fasteners 100.

Figure 5:
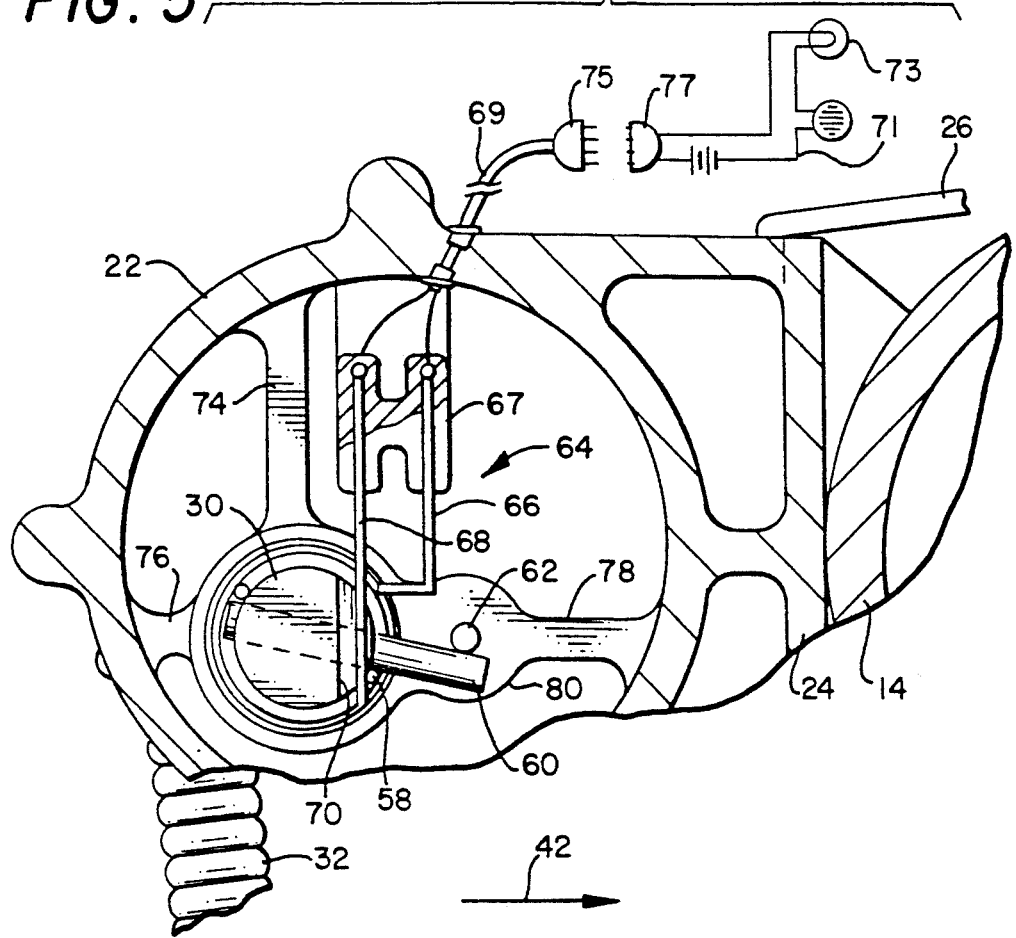
FIG. 5 is a partial cross-sectional view of the sealable housing taken along line 5—5 of FIG. 2 showing a non-activated switch position.
Figure 6:
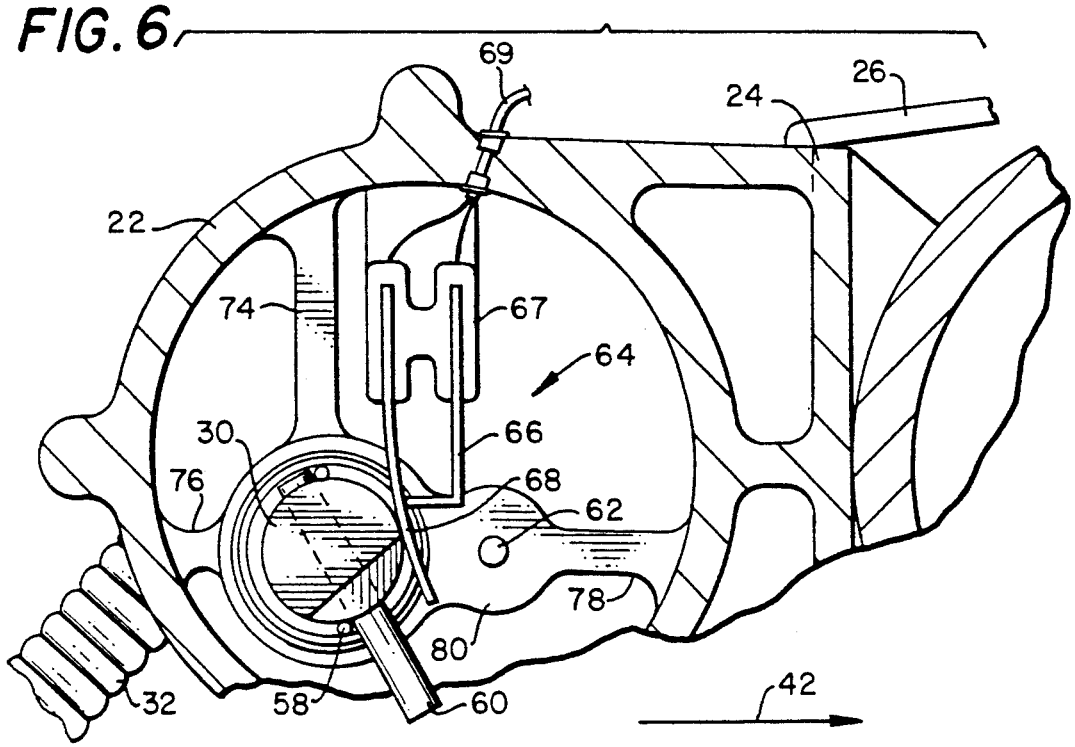
FIG. 6 is a partial cross-sectional view of the sealed housing of a low tire detection device according to the present invention showing an activated switch position.

FIGS. 5 and 6 are partial cut-away end views of an injection molded water-tight housing 22, taken along section line 5—5. FIG. 5 shows switch 64 in a first non-activated switch position. FIG. 6 shows switch 64 in a second activated position. A torsional bias spring 58 holds shaft 30 in a first rotational position at which a shaft stop pin 60 is held firmly against housing stop block 62. In this position, the resilient sensor rod 32 is in the angled forward position as previously described. Advantageously, switch 64 is a simple and reliable contact switch which may be composed of a fixed contact 66 and a flex contact 68. Flex contact 68 is positioned adjacent a shaft cam 70 which is advantageously a flat surface formed partially into the exterior of rotational shaft 30. Rotation of shaft 30 causes shaft cam 70 to push against flex contact 68 and move flex contact 68 into electrical contacting engagement with fixed contact 66. Both fixed contact 66 and flexed contact 68 may be conveniently economically constructed of a strip of stainless steel material or other electrically conducting and non-corrosive materials. The flexure can be advantageously provided by constructing contacts 66 and 68 of a thin steel material which resiliently returns to its non-contacting position when not actuated through the rotation of shaft cam 70 on shaft 30. The contacts 68 and 66 may be held in an insulating contact holding boss 67 in the appropriate spaced apart non-contacting position until the deflation of the tire causes sensor rod 32 to actuate rotation of shaft 30. The insulated contact holding boss 67 may be conveniently molded directly into the injection molded housing 22 or may alternatively be constructed of a resilient polymeric or rubber material adhered to the inside of housing 22. Flexibility of contacts 66 and 68 avoids breakage due to sudden impact of sensor rod 32 or sudden rotation of rotation shaft 30.

Subsequently (as shown in FIG. 6), upon tire deflation, sensor rod 32 moves rearwardly and rotates shaft 30. Cam 70 engages flex contact 66 and moves it against contact 68. Extending from fixed contact 66 and flex contact 68 are electrical conductors 69 which sealingly and insulatively extend through housing 22 and are interconnected through electrical circuit means 71 to a warning device 73 in the cab of the vehicle pulling the trailer. Preferably, the wire connections extend to an existing trailer connection plug 75 which interconnects with a vehicle connector plug 77 so that the warning device 73 is activated in the towing vehicle cab upon closure of the electrical circuit through contact of flex contact with the fixed contact 66.

Housing 22 is advantageously made of injection molded plastic. Shaft 30 is securely supported with a minimum of plastic material through the use of appropriately positioned molded support struts 74, 76 and 78. One of the support struts, such as strut 78, can be further molded with a boss 80 to which housing stop block 62 is affixed in an appropriate position such that torsion bias spring 58 rotates shaft stop pin 60 into an abutting relationship against stop block 62. This simplified construction reliably holds shaft 30 and attached resilient sensor rod 32 in the desired downwardly projecting non-activated sensor position (as shown in FIG. 5). Further, after activation and tire repair, the sensor rod automatically moves back from the activated position (as shown in FIG. 6) to the non-activated position.

Thus, what has been disclosed is a water-tight low pressure tire warning device which may be constructed of a cost-effective two piece injection molding with a single rotational shaft and an inexpensive reliable electrical contact switch. The device is conveniently attached to an axle and advantageously provides a resilient sensor rod which contacts the ground upon deflation of the tire. The resiliency of the sensor rod allows non-destructive contact with a roadway surface to occur even at high speed and rough roadway conditions. Further, the unique rotational axle provides for complete and simple sealing so that the internal mechanism is not adversely affected by contaminants such as water or even salt water, thereby providing a trailer warning device useful on boat trailers and the like. Further, the forward angle of the sensor rod is uniquely and advantageously permitted through the use of a resilient sensor rod and provides the additional benefit of moving the sensor rod over center into a switch activated condition, thereby reducing the occurrences of false indications of tire deflation due to bouncing, as may result using a vertically extending sensor rod.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

What is claimed is:

1. A low tire pressure detection device for use in detecting deflation of a tire while it is supporting a tow trailer from a surface for movement in a forward direction therealong, said device comprising:
   (a) a sealed housing enclosing an electrical contact switch activatable upon rotation of a pivot shaft from a first biased non-signal position to a second signal position, which pivot shaft has an outside portion which sealingly and rotatably extends through a portion of said housing;
   (b) a flexible resilient sensor rod mounted on said outside portion of said pivot shaft extending therefrom at an angle forward in the forward direction of movement of said tire with said pivot shaft in said first biased non-signal position, said resilient sensor rod having an end spaced a predetermined distance from said surface, such that upon at least partial deflation of said tire, said resilient sensor rod contacts said surface and is moved over center to rotate said pivot shaft to said second signal position; and
   (c) a remote signal device electrically activated upon rotation of said pivot shaft to said second signal position.

2. A low tire pressure detection device as in claim 1 wherein said resilient sensor rod further comprises a coil spring.

3. A low tire pressure detection device as in claim 1 wherein said resilient sensor rod is adjustably clamped to said pivot shaft.

4. A low tire pressure detection device as in claim 1 further comprising a hanger arm mounted to an axle extending substantially horizontally therefrom for holding said resilient sensor rod in a non-operating position.

5. A low tire pressure sensor as in claim 4 wherein said switch enclosed within said housing further comprises:
   (a) a cam formed on said pivot shaft within said housing;
   (b) a grounded movable contact positioned adjacent said cam for movement thereof upon rotation of said pivot shaft; and
   (c) another contact spaced apart from said movable contact and engageable therewith to complete an electrical circuit upon rotation of said pivot shaft so that said cam moves said movable contact into engagement with said other contact.

6. A low tire pressure detection device for use in detecting deflation of a tire while it is supporting a tow trailer from a surface for movement in a given direction therealong, said device comprising:
   (a) a sealed housing enclosing an electrical contact switch activatable upon rotation of a pivot shaft from a first biased non-signal position to a second signal position, which pivot shaft has an outside portion which sealingly and rotatably extends through a portion of said housing wherein said switch enclosed within said housing further comprises:
      (i) a cam formed on said pivot shaft within said housing for rotation with said pivot shaft;
      (ii) a flexible contact positioned adjacent said cam for movement of said flexible contact upon rotation of said pivot shaft from said first biased non-signal position to said second signal position; and
      (iii) a fixed contact spaced apart from said flexible contact engageable by said flexible contact to complete an electrical circuit upon rotation of said pivot shaft from said first biased non-signal position to said second signal position, such that said cam moves said flexible contact;
   (b) a resilient sensor rod mounted on said outside portion of said pivot shaft extending therefrom at an angle forward in the direction of movement of said tire with said pivot shaft in said first biased non-signal position, said resilient sensor rod having an end spaced a predetermined distance from said surface, such that upon at least partial deflation of said tire, said resilient sensor rod contacts said surface and is moved over center to rotate said pivot shaft to said second signal position; and
   (c) a remote signal device electrically activated upon rotation of said pivot shaft to said second signal position.

7. A low tire pressure detection device for use in detecting deflation of a tire while it is supporting a tow trailer from a surface for movement in a given direction therealong, said device comprising:
   (a) a sealed housing enclosing an electrical contact switch activatable upon rotation of a pivot shaft from a first biased non-signal position to a second signal position, which pivot shaft has an outside portion which sealingly and rotatably extends through a portion of said housing, wherein said sealed housing further includes an injection molded housing having a closed side and an open side, a bearing formed in said housing and sized for rotational support of said pivot shaft, a seal held in said closed side of said housing coaxially with said bearing for sealing said pivot shaft extending therethrough, and a cap sealingly engageable in said open end of said housing to thereby seal said housing;
   (b) a resilient sensor rod mounted on said outside portion of said pivot shaft extending therefrom at an angle forward in the direction of movement of said tire with said pivot shaft in said first biased non-signal position, said resilient sensor rod having an end spaced a predetermined distance from said surface, such that upon at least partial deflation of said tire, said resilient sensor rod contacts said surface and is moved over center to rotate said pivot shaft to said second signal position; and
   (c) a remote signal device electrically activated upon rotation of said pivot shaft to said second signal position.

8. A low tire pressure sensor for use in detecting deflation of a tire while it is supporting a vehicle or trailer from a ground surface comprising:
   (a) a water-resistant housing;
   (b) means for attaching said water-resistant housing to an axle adjacent to said tire to be sensed;
   (c) a pivot shaft horizontally supported through a seal in said water-resistant housing substantially perpendicular to the direction of motion of said vehicle and having a portion extending inside said housing, another portion extending outside of said housing, said pivot shaft being rotatable between a first rotation position and a second rotation position;

(d) a resilient sensor rod mounted on said pivot shaft extending therefrom spaced at an end thereof within a predetermined close distance from said ground surface and biased forward at a slight angle from vertical when it is in said first rotation position such that deflation of said tire activates said sensor rod to rotate said pivot shaft to said second rotation position;

(e) a switch mounted inside said water-resistant housing adjacent to said inside portion of said pivot shaft and engageable upon rotation of said pivot shaft from said first to said second rotation position; and (f) a signal means electrically interconnected with said switch for signalling an operator upon rotation of said pivot shaft from said first to said second rotation position.

9. A low tire pressure sensor as in claim 8 wherein said resilient sensor rod further comprises a coil spring.

10. A low tire pressure sensor as in claim 8 wherein said resilient sensor rod is adjustably clamped to said pivot shaft so that said predetermined distance from said sensor rod end to said ground is adjustable.

11. A low tire pressure sensor as in claim 8 wherein said switch enclosed within said housing further comprises:

(a) a cam formed on said pivot shaft within said housing;

(b) a grounded movable contact positioned adjacent said cam for movement thereof upon rotation of said pivot shaft; and (c) another contact spaced apart from said movable contact and engageable therewith to complete an electrical circuit upon rotation of said pivot shaft so that said cam moves said movable contact into engagement with said other contact.

12. A low tire pressure sensor as in claim 8 wherein said water-resistant housing further comprises:

(a) an injection molded housing having a closed side and an open side;

(b) a bearing boss formed rigidly supported in said housing having a cylindrical bearing surface formed therein for rotational support of said pivot shaft;

(c) a seal held in said closed side of said housing coaxially with said cylindrical bearing surface for sealing said pivot shaft extending therethrough; and (d) a cap sealingly engageable in said open end of said housing to thereby seal said housing.

* * * * *